United States Patent
Jeong et al.

(10) Patent No.: US 7,924,532 B2
(45) Date of Patent: Apr. 12, 2011

(54) HEAD GIMBAL ASSEMBLY OF HARD DISK DRIVE HAVING SUPPORT ELEMENT IN A BONDING REGION OF A SLIDER

(75) Inventors: Ki-tag Jeong, Hwaseong-si (KR);
Yong-chul Yoo, Suwon-si (KR);
Yoon-gyu Kam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 785 days.

(21) Appl. No.: 11/869,880

(22) Filed: Oct. 10, 2007

(65) Prior Publication Data
US 2008/0130175 A1    Jun. 5, 2008

(30) Foreign Application Priority Data
Dec. 5, 2006  (KR) ........................ 10-2006-0122590

(51) Int. Cl.
*G11B 5/55*    (2006.01)
(52) U.S. Cl. .................................. 360/245.8; 360/234.5
(58) Field of Classification Search ................ 360/234.5, 360/245.8–245.9
See application file for complete search history.

(56) References Cited

U.S. PATENT DOCUMENTS

| | | | |
|---|---|---|---|
| 6,198,599 B1 | 3/2001 | Senuma | |
| 6,775,101 B2 | 8/2004 | Satoh et al. | |
| 6,927,951 B2 * | 8/2005 | Huha et al. | 360/323 |
| 7,595,963 B1 * | 9/2009 | Chen et al. | 360/245.9 |

FOREIGN PATENT DOCUMENTS

| | | |
|---|---|---|
| JP | 2001-102739 | 4/2001 |
| JP | 2006-209918 | 8/2006 |
| JP | 2006-286155 | 10/2006 |

OTHER PUBLICATIONS

Korean Office Action dated Oct. 18, 2007 issued in KR 2006-0122590.

* cited by examiner

*Primary Examiner* — A. J. Heinz
(74) *Attorney, Agent, or Firm* — Stanzione & Kim, LLP

(57) ABSTRACT

A head gimbal assembly (HGA) of a hard disk drive (HDD) includes a flexure, a slider attached to the flexure and including a magnetic head, a plurality of pads at a side of the slider, a plurality of traces attached to and supported by the flexure and respectively bonded to the pads to form an electrically continuous circuit therebetween, and an insulating support element covering a bonding region between the pads and the traces.

25 Claims, 7 Drawing Sheets ature, which is formed on the dielectric film 17.

HEAD GIMBAL ASSEMBLY OF HARD DISK DRIVE HAVING SUPPORT ELEMENT IN A BONDING REGION OF A SLIDER

CROSS-REFERENCE TO RELATED APPLICATIONS

This application claims the benefit of priority under 35 U.S.C. §119(a) of Korean Patent Application No. 10-2006-0122590, filed on Dec. 5, 2006, in the Korean Intellectual Property Office, the disclosure of which is incorporated herein by reference in its entirety.

BACKGROUND OF THE INVENTION

1. Field of the Invention

The present general inventive concept relates to a hard disk drive (HDD), and more particularly, to a head gimbal assembly (HGA) of a HDD having a support structure disposed between a slider with a magnetic head and a supporting flexure.

2. Description of the Related Art

A hard disk drive (HDD) is a well-known information storage device that records data on a disk and/or reproduces data from the disk using a magnetic head. The HDD includes an actuator which moves the magnetic head to a desired position on the disk. The actuator includes a swing arm, a voice coil motor (VCM), and a head gimbal assembly (HGA). The swing arm is pivotally installed on a base member of the HDD. The VCM provides a driving force to pivot the swing arm. The HGA is installed at the swing arm to support the magnetic head so as to elastically bias the magnetic head toward a surface of the disk.

FIG. 1A is a perspective view of a HGA of a conventional HDD, and FIG. 1B is an enlarged view of portion A of FIG. 1A. Referring to FIGS. 1A and 1B, an HGA 10 of an actuator of a HDD includes a flexure 12, a slider 14, and a magnetic head 16. The slider 14 is attached to and supported by the flexure 12. The magnetic head 16 is disposed in the slider 14. A plurality of traces 18 are provided on the flexure 12 and are electrically connected to the magnetic head 16. A plurality of pads 20 are provided at a side of the slider 14. The traces 18 are bonded to the pads 20 through solder balls 22 so as to be electrically connected to the pads 20. The number of traces 18 is typically four (4) corresponding to two read signals R+ and R− and two write signals W+ and W−. Accordingly, the number of the pads 20 is typically four (4) as well.

Various modifications have been recently applied to the HGA to support additional features and to facilitate its construction. For example, flying on demand (FOD) is a technique to thermally expand the slider 14 through an application of heat thereto, which consequently reduces a gap between the magnetic head 16 and the surface of the disk, i.e., to dynamically lower a flight height of the magnetic head 16. Thus, two additional traces 18 corresponding to two FOD signals FOD+ and FOD− and two additional pads 20 are required to apply such a FOD technique. Thus, the total number of traces 18 provided on the flexure would be six (6), and the number of pads 20 provided at the slider 14 would also be six (6) to implement an HGA with FOD support.

Other recent modifications include forming a slot 24 in the flexure 12, such as is illustrated in FIG. 1B, to verify proper alignment of the slider 14 during assembly of the HGA. As is illustrated in FIG. 1B, the slot 24 may be formed as an arc defining an island 13 adjacent the circuit pad edge of the slider 14. Such a slot 24 can be used to assure alignment of the slider 14.

The implementation of a greater number of additional features on an increasingly smaller HGA is limited by the physical support structure that allows the magnetic head 16 to fly above the disk at its proper height. The support structure is also required to prevent discontinuities from forming between the pads 20 of the magnetic head 16 and the corresponding traces 18, particularly after physical shock has been applied to the HDD. Consider, for example, when the number of pads 20 provided on the slider 14 is increased while the size of each pad 20 is required to remain fixed. Under such conditions, the distances between the pads 20 are reduced and the sizes of the solder balls 22 must also be reduced. As a result, the mechanical support provided by the solder bond between the pads 20 and the traces 18 is significantly lowered. It has been determined through measuring the bonding strength between the pads 20 and the traces 18 that the bonding strength is approximately 20% lower when the number of pads 20 is increased from four (4) to six (6). Further compromises to the support structure are introduced by the slot 24, which creates a point where non-elastic deformation of the flexure 12, e.g., a bend, may occur. Although some bending of the flexure 12 can be tolerated if significant degradation of the flight characteristics of the slider 14 is avoided, most non-elastic deformation of the flexure 12 renders the HGA unusable.

If the HGA 10 having the above-described structure undergoes shock from an outside source, the flexure 12 may strike against a ramp (not illustrated) on which the HGA 10 is parked. If the bonds between the pads 20 and the traces 18 have diminished bonding strength and the slot 24 is formed in the flexure 12, a front end of the flexure 12 may be non-elastically deformed. Not only can the flight characteristics of the slider 14 be compromised as a result of such an impact, but also the electrical circuit between the pads 20 and the traces 18 may open to render the HGA 10 inoperative.

FIGS. 2A, 2B, and 2C are photographs illustrating problems of the HGA 10.

FIG. 2A illustrates a deformation of the flexure 12 caused by the impact of the flexure 12 against the ramp. Lighter regions depicted in FIG. 2A signify a portion of the flexure 12 that has been significantly deformed. As is illustrated in FIG. 2B, the front end of the flexure 12 has been non-elastically deformed to a great degree.

Referring to FIG. 2C, not only is the front end of the flexure 12 bent but the bonding parts between the pads 20 of the slider 14 and the traces 18 are cracked.

FIG. 3 is a cross-sectional view of the flexure 12 taken along line B-B' of FIG. 1B, and FIG. 4 is a photograph illustrating the cracked solder bonds between the pad 20 at an edge of the slider 14 and the trace 18.

Referring to FIGS. 1B and 3, the flexure 12 may have a base structure formed of a stainless sheet. A dielectric film 17 formed of polyimide is applied to a surface of the flexure 12, and the traces 18 are formed of copper (Cu) on the dielectric film 17. A portion 13 of the flexure 12 is contained within the boundaries of the slot 24 forms an island shape in the flexure 12 that is isolated from other parts of the flexure 12 by the slot 24. Consequently, those traces 18 positioned at the outer edges of the slider 14 are not supported by the flexure 12 formed of the stainless sheet. Thus, if the HDD suffers an impact from an outside force, it is highly likely that the bonding parts between the traces 18 at the edges of the flexure 12 and the corresponding pads 20 will be cracked, especially if the HGA 10 is parked on the ramp 140.

Referring to FIG. 4, the solder bond between the pad 20 positioned at the edge of the slider 14 and the trace 18 corresponding thereto is cracked.

As described above, in current HGA design trends, the strength of the support structure stabilizing the fight of the slider and the electrical contact between pads and traces is lowered.

SUMMARY OF THE INVENTION

The present general inventive concept provides a head gimbal assembly (HGA) of a hard disk drive (HDD) having a slider support structure to allow a greater number of features to be implemented in the HGA.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an HGA of an HDD including a flexure, a slider attached to the flexure and including a magnetic head, at least six pads provided at a side of the slider, at least six traces attached to and supported by the flexure and bonded to the at least six pads to be electrically connected to the at least six pads, respectively, and an insulating support element covering bonded regions between the at least six pads and the at least six traces.

The at least six pads may be bonded to the at least six traces using solder balls.

The insulating support element may be formed of an epoxy-based resin.

A portion of the insulating support element covering the traces of the at least six traces disposed at both edges of the slider may be thicker than a thinner portion of the support element covering the traces of the at least six traces disposed in a center of the slider. In this case, the thicker portion of the insulating support element may have a thickness between 40 μm and 50 μm, and the thinner portion of the support element may have a thickness between 20 μm and 30 μm.

A slot may be formed in the flexure to view a position of the slider, and the insulating support element may span the slot.

An island may be formed in the flexure due to the slot, and a portion of the support element covering the traces of the at least six traces that are not supported by the flexure may be thicker than a thinner portion of the support element covering the traces that are supported by the flexure. In this case, the traces that are not supported by the flexure may be the traces disposed at outer edges of the slider.

The foregoing and/or other aspects and utilities of the present general inventive concept are also achieved by providing a head gimbal assembly including a slider to lift a magnetic head from a surface of a rotating disk through a lifting force of a pressure differential generated thereby, a flexure flexibly coupled to the slider to form a bonding region, the flexure being biased in a direction to oppose the lifting force, and a support element disposed in the bonding region to decrease flexibility of the flexure therein, the support element applying a force supplemental to the to the bias on the flexure such that the lifting force lifts the slider and the support element a predetermined distance from the rotating disk.

The foregoing and/or other aspects and utilities of the present general inventive concept are also achieved by providing a hard disk drive including a disk to rotate and generate thereby a pressure differential at its surface, a head gimbal assembly including a slider to lift a magnetic head from a surface of the rotating disk through a lifting force of the pressure differential generated thereby, a flexure flexibly coupled to the slider to form a bonding region, the flexure being biased in a direction to oppose the lifting force, and a support element disposed in the bonding region to decrease flexibility of the flexure therein, the support element applying a force supplemental to the to the bias on the flexure such that the lifting force lifts the slider and the support element a predetermined distance from the rotating disk, and an actuator to position the head gimbal assembly over the rotating disk.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
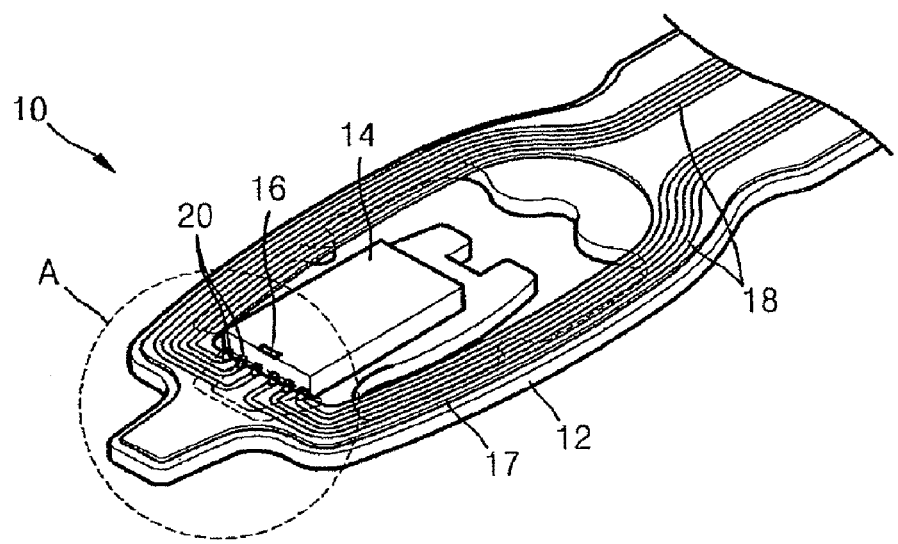
FIG. 1A is a perspective view of a conventional head gimbal assembly (HGA) of a hard disk drive (HDD)
Figure 1B:
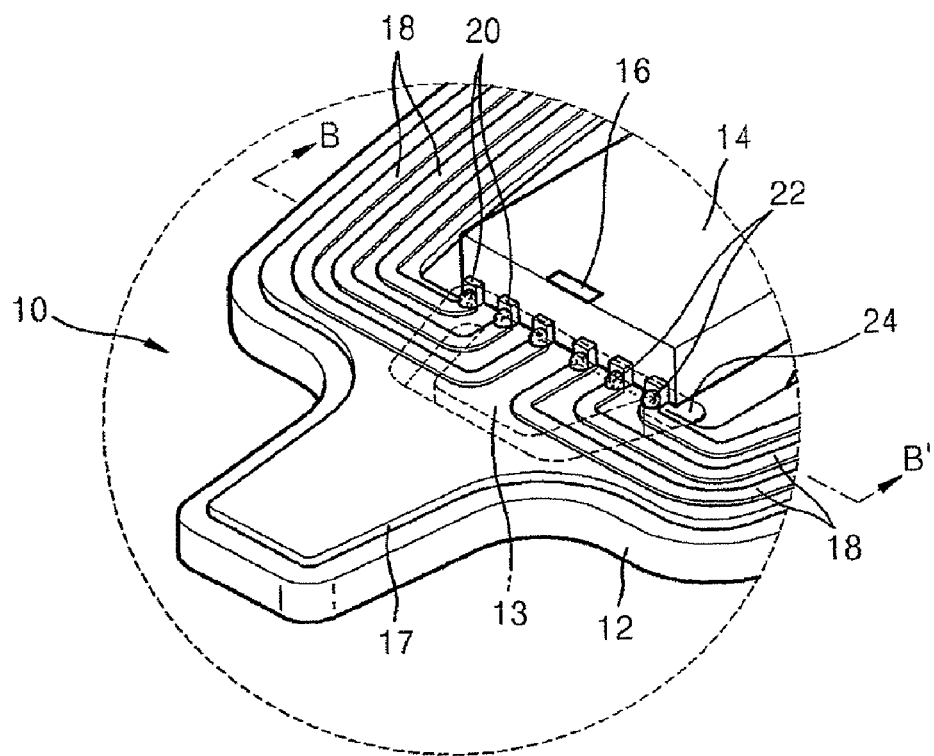
FIG. 1B is an enlarged view of portion A of FIG. 1A.
Figure 2A:
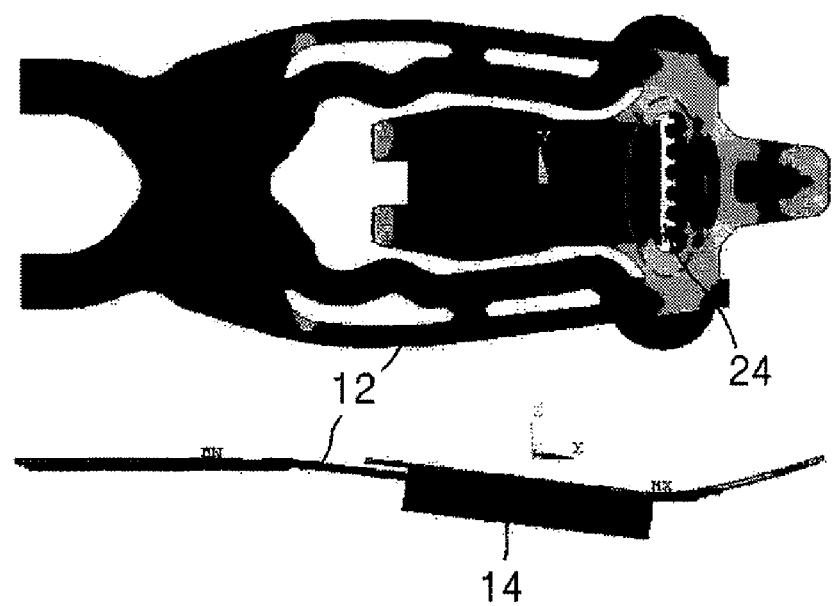
FIGS. 2A, 2B, and 2C are photographs illustrating shortcomings of the HGA of FIG. 1A.
Figure 2B:
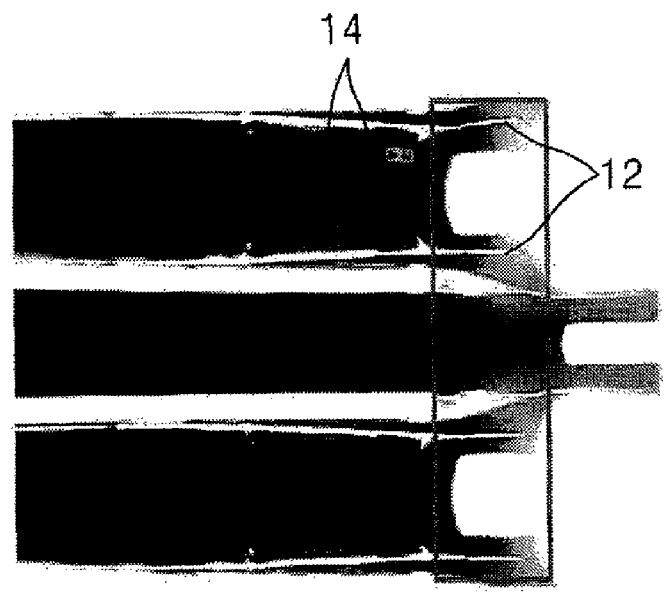
Figure 2C:
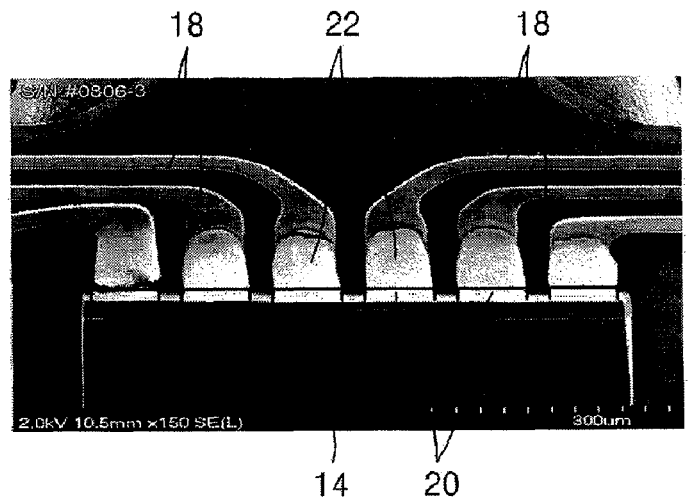
Figure 3:
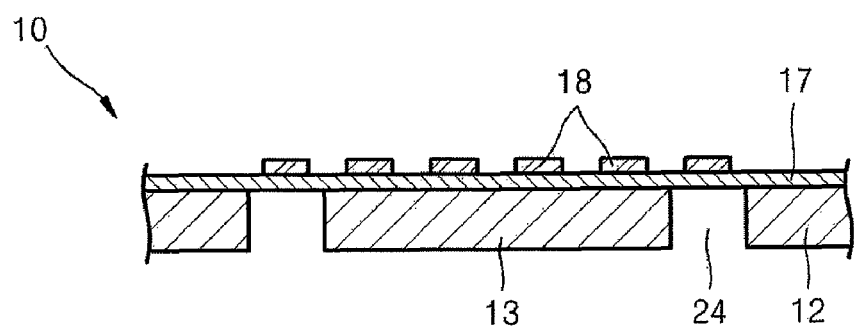
FIG. 3 is a cross-sectional view of a flexure taken along line B-B' of FIG. 1B.
Figure 4:
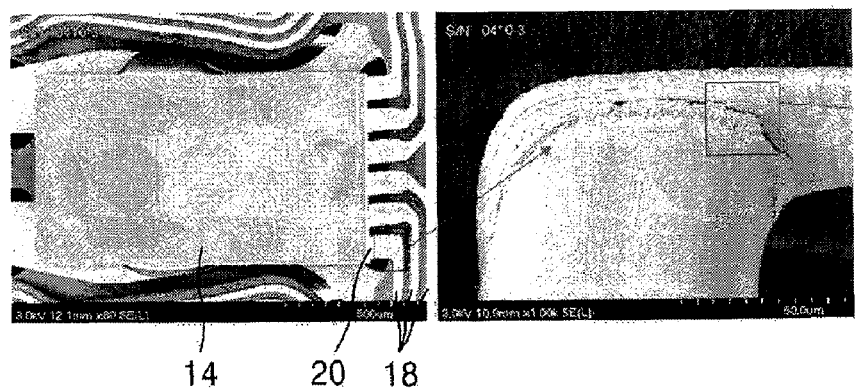
FIG. 4 is a micrograph illustrating a cracked bonding part between a pad positioned at an edge of a slider and a trace.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 5:
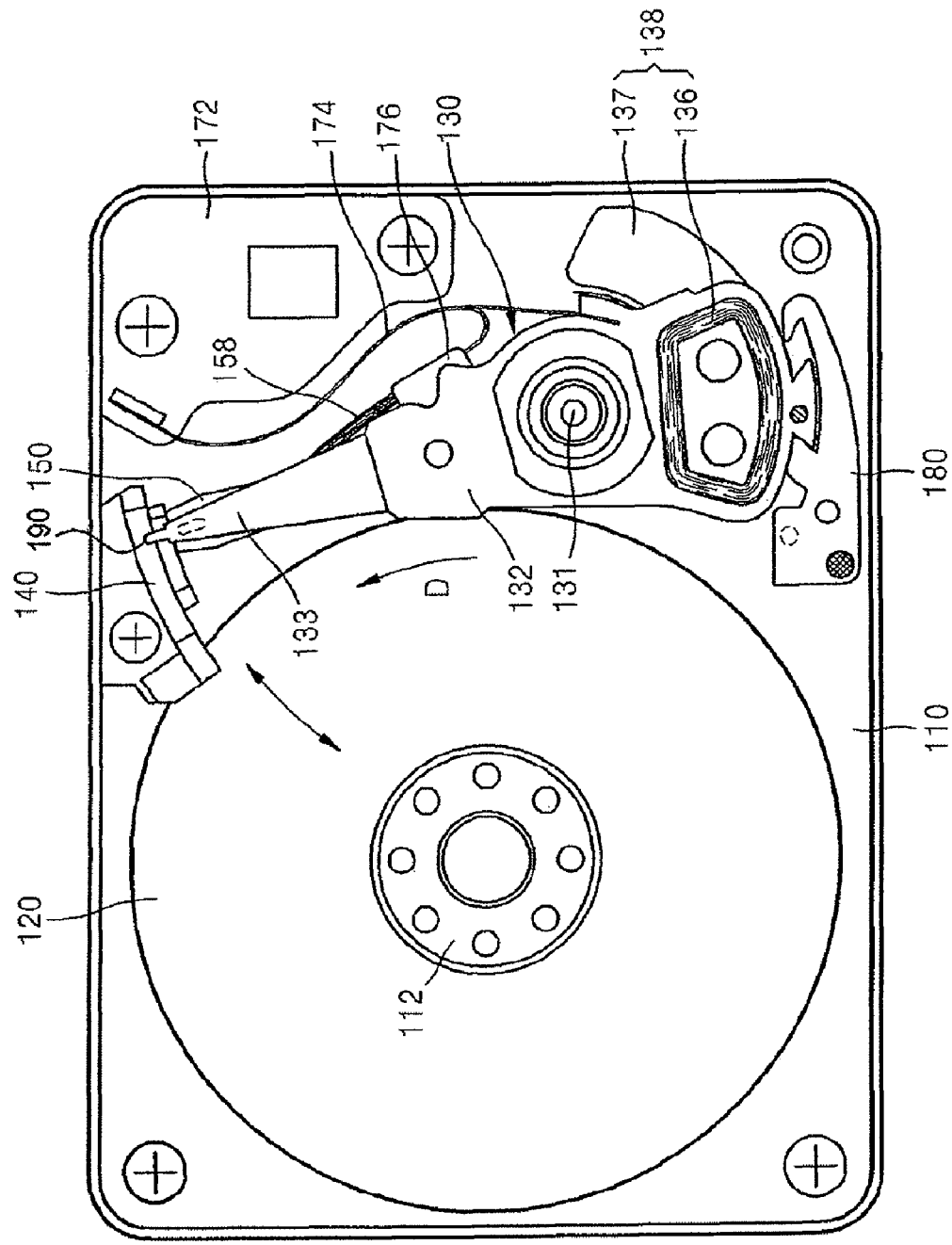
FIG. 5 is a schematic plan view of a HDD including a HGA according to an embodiment of the present general inventive concept.
Figure 6:
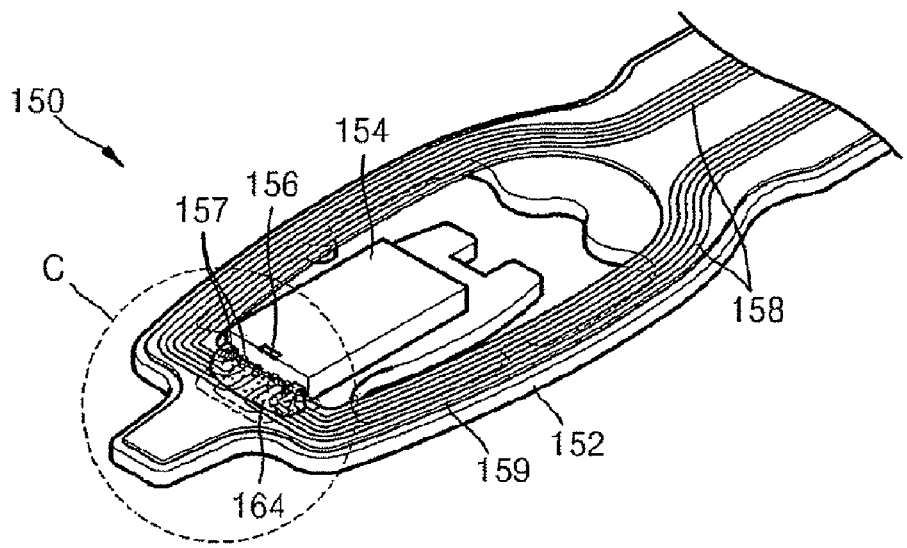
FIG. 6 is a perspective view of the HGA of FIG. 5.
Figure 7:
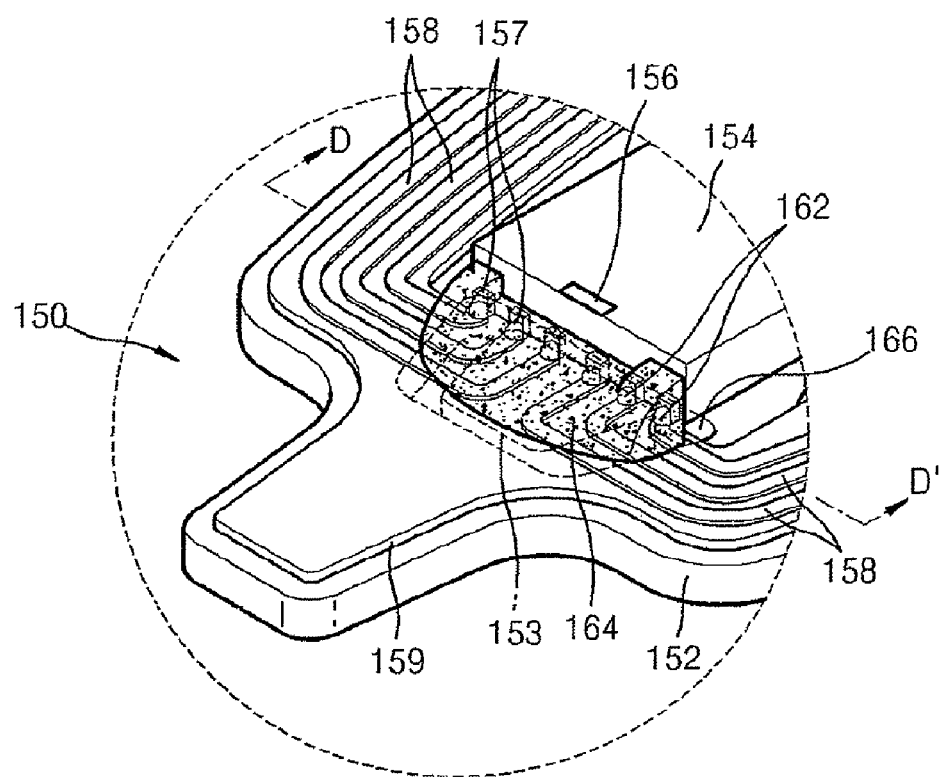
FIG. 7 is an enlarged view of portion C of FIG. 6.

FIG. 5 is a schematic plan view of an HDD including an HGA according to an embodiment of the present general inventive concept, FIG. 6 is a perspective view of the exemplary HGA of FIG. 5, and FIG. 7 is an enlarged view of portion C of FIG. 6. It is to be understood that while the descriptions below will be confined to a single disk accessed by a single HGA, multiple disks and multiple HGAs may be incorporated without deviating from the spirit and intended scope of the present general inventive concept.

Referring to FIGS. 5 through 7, the exemplary HDD includes a disk 120 and an actuator 130. The disk 120 may be mounted on a spindle motor 112. The actuator 130 moves a magnetic head 156 to a predetermined position on the disk 120. Here, the magnetic head 156 is used to record and/or reproduce data. The actuator 130 may include a swing arm 132, a load beam 133, an HGA 150, and a voice coil motor (VCM) 138. The swing arm 132 may be disposed on an actuator pivot 131 pivotally installed on a base member 110 of the HDD. The load beam 133 may be installed on the swing arm 132. The HGA 150 may be installed at a distal end of the load beam 133 to support a slider 154 having the magnetic head 156. The load beam 133 may be constructed so as to bias the HGA 150 toward a surface of the disk 120. The VCM 138 may pivot the swing arm 132 to position the magnetic head 156 at a desired track on the disk 120.

The VCM 138 may include a VCM coil 136 disposed on a rear end of the swing arm 132, and a magnet 137 facing the VCM coil 136. The VCM 138 having the above-described structure may be controlled by a servo control system and pivots the swing arm 132 in a direction established from the interaction between a current input to the VCM coil 136 and a magnetic field of the magnet 137, where the direction may be determined using Fleming's Left Hand Rule. In certain embodiments of the present general inventive concept, the HDD includes a ramp loading type head parking system. The HGA 150 is illustrated in FIG. 5 in an exemplary parked position, where a parking tab 190 is biased by the load beam 133 against a parking surface of the ramp 140. The parking tab 190 allows the slider 154 to be free from contact with any parking structure so as to protect the smooth surface of the slider 154 from damage. Moreover, the loading type head parking system overcomes stiction problems at the disk/slider interface by allowing the disk to generate an air bearing through a pressure differential of the rotating disk prior to positioning the slider over the disk surface. Accordingly, when the HDD is powered on and the disk 120 starts rotating toward direction D indicated by the arrow in FIG. 5, the VCM 138 pivots the swing arm 132 counterclockwise to move the magnetic head 156 mounted on the slider 154 from the ramp 140 installed outside the disk 120 onto a recording surface of the disk 120. Upon the HDD being powered off, the rotation of the disk 120 slows and the VCM 138 pivots the swing arm 132 clockwise to position the magnetic head 156 away from the disk 120. Thus, the magnetic head 156 is removed from the recording surface of the disk 120 and is parked on the ramp 140 installed outside the disk 120.

The HDD may further include a latch lever 180 to engage the actuator 130 upon cessation of disk 120 rotation to keep the magnetic head 156 in the parking area, e.g., parked on the ramp 140.

The HDD may further include a printed circuit board (PCB) 172 which, among other things, controls the actuator 130 and provides other signals to the HGA 150. The PCB 172 may be electrically connected to the VCM coil 136 of the VCM 138 and a connection pad 176 attached to the swing arm 132 through a flexible printed circuit 174. The connection pad 176 may be electrically connected to the slider 154 of the HGA 150 through a plurality of traces 158.

In certain embodiments of the present general inventive concept, the HGA 150 includes a flexure 152 attached to and biased by the load beam 133. The slider 154 may be flexibly coupled to the HGA 150 through the flexure 152, and the magnetic head 156 may be mounted on the slider 154. A predetermined number of pads 157, for example six (6) pads 157, may be provided at a side of the slider 154 to send and receive signals of features supported thereby, and a corresponding number of traces 158, e.g., six (6) traces 158, may be provided on the flexure 152 to communicate the signals to the slider 154. The slider 154 and the flexure 152 may form a bonding region in which the traces 158 respectively terminate at the pads 157. Other features may be provided to the HGA 150 and certain of those features, such as portions of the slot 166 to be described further below, may be incorporated in the bonding region between the flexure 152 and the slider 154. It is to be understood that the present general inventive concept is not limited to the dimensions of the bonding region, which may extend onto the slider 154 and onto the flexure 152 without bound.

The six traces 158 may be affixed to and supported by the flexure 152 and extend along the flexure 152 to be electrically connected to the connection pad 176.

The flexure 152 may be formed from an elastic material, for example, a stainless sheet, having a predetermined flexibility, i.e., can be modified in shape by applying a predetermined amount of force. A dielectric film 159, such as a polyimide film, may be applied to an upper surface of the flexure 152. The traces 158 may be formed from a conductive metal, such as copper (Cu), and may be disposed on an upper surface of the dielectric film 159. The six pads 157 may serve as ports to carry two read signals R+ and R−, two write signals W+ and W−, and two FOD signals FOD+ and FOD− to and from the slider 154. The six traces 158 may carry the two read signals R+ and R−, the two write signals W+ and W−, and the two flying on demand (FOD) signals FOD+ and FOD− to and from the PCB 172. The pads 157 may be electrically and mechanically bonded to the traces 158 through solder balls 162 in one-to-one correspondence.

In the embodiment described above, the six pads 157 are provided at the slider 154 to additionally support an FOD technique. Various other techniques may require additional circuits to the slider 154. Thus, a larger number of pads 157 and a larger number of traces 158, e.g., seven or eight pads 157 and seven or eight traces 158, may be provided and it is to be understood that such additional circuit support falls within the spirit and intended scope of the present general inventive concept.

Figure 8:
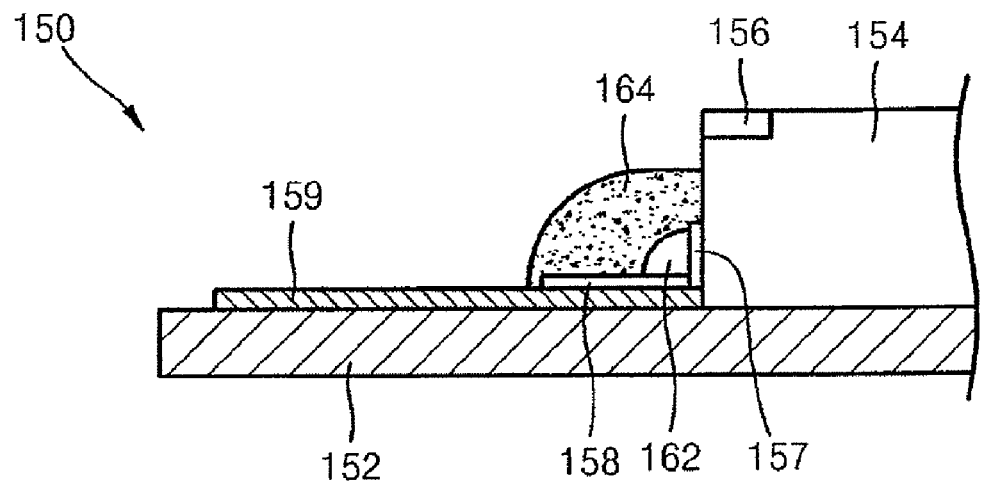
FIG. 8 is a side view of the portion C of FIG. 6.
Figure 9:
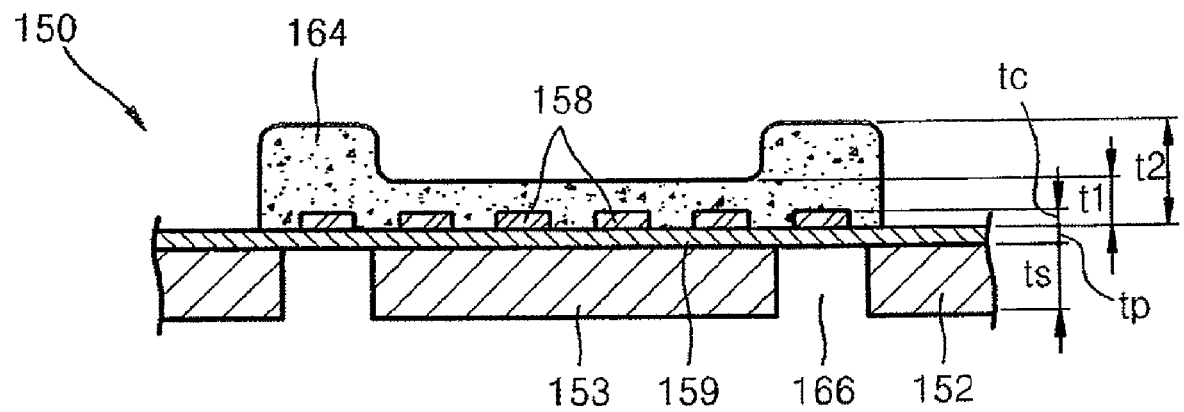
FIG. 9 is a cross-sectional view of the HGA taken along line D-D' of FIG. 7.

FIG. 8 is a side view of the portion C of FIG. 6, and FIG. 9 is a cross-sectional view of the HGA 150 taken along line D-D' of FIG. 7. Referring to FIGS. 7 through 9, a support element 164 may be applied in the bonding region between the pads 157 and the traces 158, and may be affixed to one or more of the flexure 152, the dielectric film 159, the slider 154, the pads 157 and the traces 158. The support element 164 may be constructed to effectively reduce the flexibility of the flexure 152 in the bonding region, i.e., requiring a greater force to modify the shape of the flexure 152 in the bonding region. In certain embodiments of the present general inventive concept, the support element 164 renders the flexure 152 rigid in the bonding region, i.e., the relative orientation of the flexure 152 and the slider 154 is constant in the bonding region, even when a substantial force is applied thereto. The support element 164 may be constructed from any suitable insulating material, either as a preformed unit or as a built in-place unit, to provide physical structure in the bonding region to support the added features of the HGA 150. For example, support element 164 may be formed of an insulating resin, such as an epoxy resin, applied in the bonding region via a suitable dispenser. Epoxy resin produces minimal outgases and thus is suitable to be used in the sealed environment of an HDD. Alternatively, the support element may be preformed from an insulating resin, such as epoxy resin, and applied in the bonding region prior to setting so as to maintain a preformed shape. Alternatively still, the support element 164 may be preformed from an insulating material and affixed in the bonding region through a physical process, such as an application of heat. Alternatively yet, the support element 164 may be preformed from an insulating material and affixed in the bonding region with a suitable adhesive. Many variations, modifications and alternatives of the support element 164 may be recognized by the skilled artisan upon review of this disclosure, and the present general inventive concept is intended to embrace all such variations, modifications and alternatives.

In certain embodiments of the present general inventive concept, the support element 164 spans the portions of the bonding region in which the pads 157 and the traces 158 are located, which, among other things, prevents the solder connection of dense circuitry converging in the bonding region from being cracked by an external impact.

If a slot 166 is formed in the flexure 154 to confirm an alignment position of the slider 154, the support element 164 may be formed to completely span the slot 166. Such configuration may, among other things, prevent a distal end of the flexure 152 from being bent, or otherwise non-elastically deformed, as a result of impact while the HGA 150 is in its parked position.

The support element 164 may be constructed to enhance the support structure of the HGA 150 in regions that lack the underlying physical support for additional HGA features. In accordance with embodiments of the present general inventive concept, the support element 164 cooperates with the other elements of the HGA 150 so that the dynamic characteristics thereof are maintained. For example, the flexure 152 may be biased by the load beam 133 towards the disk 120 so that when a pressure differential is created at the rotating disk's surface, the lifting force of the pressure differential opposes the biasing force to establish a predetermined distance between the slider 154 and the disk 120. The load beam 133 may be configured to provide such a bias up to a maximum load thereon and, as such, embodiments of the present general inventive concept ensures that the added load of the support element 164 does not overload the load beam 133 or limits movement of the flexure 152 in regions other than the bonding region. Additionally, certain embodiments of the present general inventive concept ensures that the support element 164 avoids altering the airflow in the neighborhood of the HGA 150 that would prevent the force necessary to oppose the biasing force sufficiently to maintain the slider 154 at the predetermined height or to add to the opposing force of the pressure differential so as to increase the distance between the slider 154 and the disk 120. Thus, the support element 164 may have a cross-sectional profile that distributes the weight thereof and, simultaneously, maintains the correct dynamic characteristics of the HGA 150.

Referring to FIG. 9, there is illustrated a support element 164 in accordance with exemplary embodiments of the present general inventive concept. As is illustrated in FIG. 9, a thickness t1 of a portion of the support element 164 covering the traces 158 disposed in a center of the slider 154, where the traces 158 have support by the flexure 152, may be less than a thickness t2 of a portion of the support element 164 covering the traces 158 positioned at both edges of the slider 154, where the traces 158 have less support from the flexure 152, due to the presence of the slot 166. The thickness t1 of the portion of the support element 164 may be relatively thin to minimize the overall weight of the support element 164. Thus, the effect of the support element 164 on the dynamic characteristics of the HGA 150, such as the flying height of the slider 154, can be minimized. Moreover, the bonds between the traces 158 and pads 157 positioned at the outside edges of the slider 154 are more susceptible to being cracked than the centrally located bonds. For purposes of numeric illustration and not limitation, if a thickness ts of the flexure 152 is about 20 μm, a thickness tp of the dielectric film 159 is about 10 μm, and a thickness tc of each of the traces 158 is about 12 μm, the thickness t1 of the portion of the support element 164 covering the traces 158 in the center may be within a range between 20 μm and 30 μm. In certain embodiments of the present general inventive concept, the thickness t2 of the portion of the support element 164 covering the traces 158 at the outside edges of the slider 154, i.e., the thicker portions of support element 164, may be within a range between 40 μm and 50 μm.

As described above, certain embodiments of the present general inventive concept include the slot 166 to allow viewing of the position of the slider 154. The addition of this feature creates portion 153 forming an island shape in the flexure 152 which is isolated from other parts of the slider 154 by the slot 166. To implement the viewing feature, the traces 158 positioned at the both edges of the slider 154 are not supported by the flexure 152 formed of the stainless sheet. In certain embodiments of the present general inventive concept, the thickness t2 of the portion of the support element 164 covering the traces 158 at the both edges of the slider 154 may be relatively thick to support the bonding region in those areas where the flexure 152 was modified to implement the viewing feature. The support element 164 can advantageously be affixed in the bonding region after the slider 154 has been aligned and soldered in position. Beneficially, cracking of the bonds formed in the bonding region can be prevented.

To illustrate the effectiveness the present general inventive concept, physical shock was applied to the HGA 10 of FIG. 1A and the HGA 150 embodiment of the present general inventive concept, respectively, in a non-operation state of the HDD, i.e. the HGA 150 in the parked position. The HGA 150 for the following demonstration included an epoxy resin support element 164 affixed to both the slider 154 and the dielectric film 159 disposed on the flexure 152. Table 1 below summarizes the demonstrations as a number of good HGA samples, i.e., those in which the bonds are not cracked after shock is applied, out of a total of three samples.

TABLE 1

|  | Impact | | |
| --- | --- | --- | --- |
|  | 1000 G/1 ms | 1100 G/1 ms | 1200 G/1 ms |
| Prior Art | 2 | 0 | — |
| Embodiments of the Present General Inventive Concept | 3 | 3 | 2 |

As illustrated in Table 1 above, if an impact of 1000 G is applied to the prior art HGA 10 for 1 ms, one sample exhibited bond cracking, but two samples exhibited no cracking. However, if an impact of 1100 G is applied to the prior art HGA 10 for 1 ms, the bonds of all three samples were cracked.

However, if impacts of 1000 G and 1100 G are applied to the HGA 150 embodiment of the present general inventive concept for 1 ms, the three samples exhibited no cracking in the bonds. Even if an impact of 1200 G is applied to the HGA 150 of the present general inventive concept for 1 ms, only one sample exhibited cracking, but the bonds of the other two samples were not cracked.

Accordingly, an impact resistance property of the HGA 150 of the present general inventive concept was considerably improved.

Figure 10:
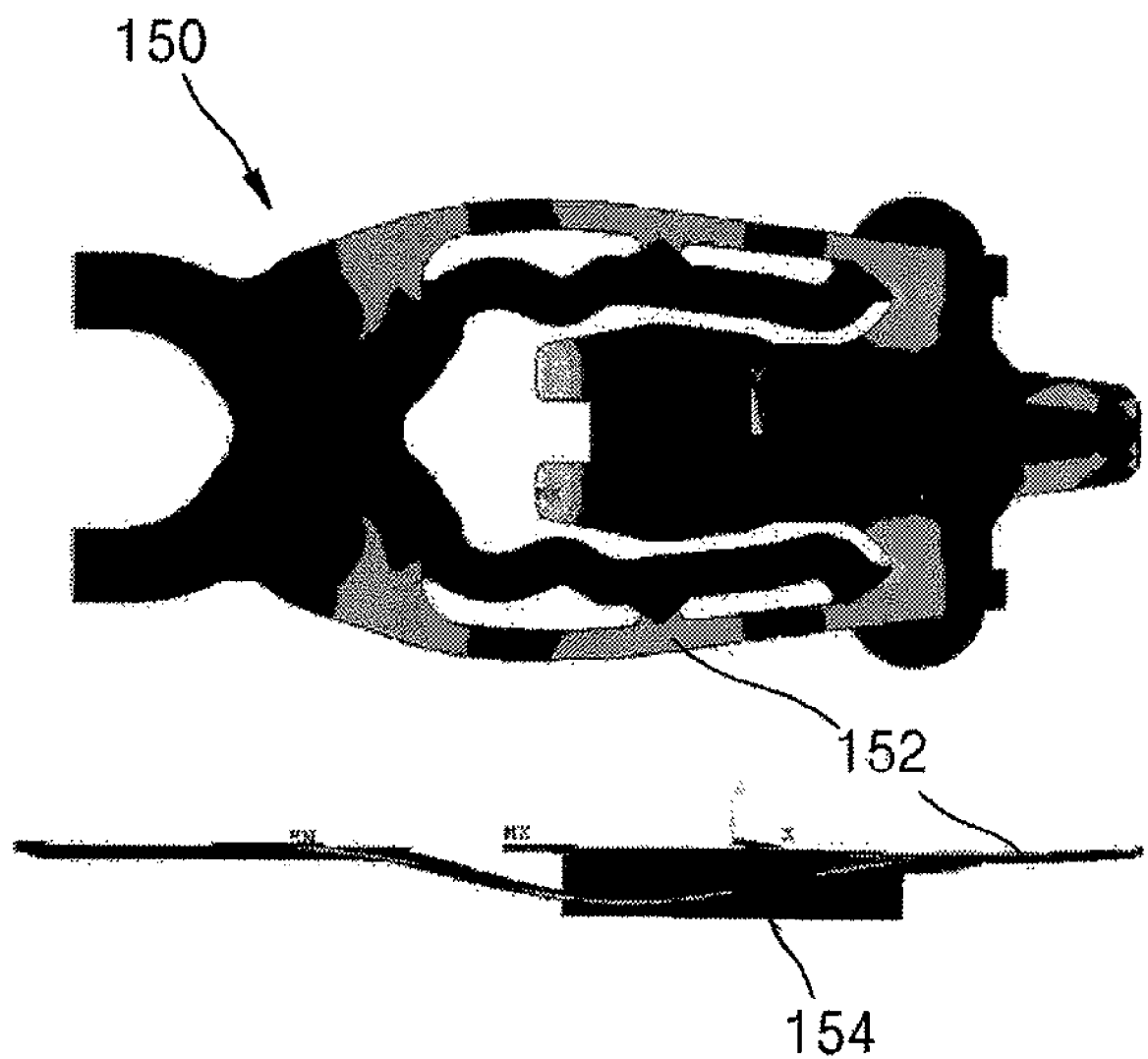
FIG. 10 is a view illustrating a deformation of a flexure caused by a crash of the flexure against a ramp due to physical shock applied from outside the HGA.

FIG. 10 is a view illustrating a deformation of the flexure 152 caused by the flexure 152 slapping against the ramp 140 upon an impact force being applied from outside the HGA 150. Referring to FIG. 10, although the flexure 152 raps against the ramp 140, the slot 166 formed in the flexure 152 is spanned by the support element 164 and the front end of the flexure 152 suffers little non-elastic deformation and is not significantly bent, even at the impact levels illustrated in Table 1.

As described above, in a HGA of a HDD according to the present general inventive concept, additional features may be supported without altering the dynamic characteristics of the HGA by incorporating a support element, such as those described in the exemplary embodiments above. Non-elastic deformation of the flexure can be prevented and cracked bonds can be prevented even through an impact applied from outside the HDD.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An HGA (head gimbal assembly) of an HDD (hard disk drive) comprising:
a flexure;
a slider attached to the flexure and including a magnetic head;
at least six pads provided at a side of the slider;
at least six traces attached to and supported by the flexure and bonded to the at least six pads to be electrically connected to the at least six pads, respectively; and
an insulating support element covering bonded regions between the at least six pads and the at least six traces,
wherein a portion of the insulating support element covering traces of the at least six traces disposed at both edges of the slider is thicker than a thinner portion of the support element covering traces of the at least six traces disposed in a center of the slider.

2. The HGA of claim 1, wherein the at least six pads are bonded to the at least six traces using solder balls.

3. The HGA of claim 1, wherein the insulating support element is formed of an epoxy-based resin.

4. The HGA of claim 1, wherein the thicker portion of the insulating support element has a thickness between 40 μm and 50 μm, and the thinner portion of the support element has a thickness between 20 μm and 30 μm.

5. The HGA of claim 1, wherein a slot is formed in the flexure to view a position of the slider, and the insulating support element spans the slot.

6. The HGA of claim 5, wherein an island is formed in the flexure due to the slot, and a portion of the support element covering the traces of at least six traces that are not supported by the flexure is thicker than a thinner portion of the support element covering the traces that are supported by the flexure.

7. The HGA of claim 6, wherein the traces that are not supported by the flexure are the traces disposed at the both edges of the slider.

8. The HGA of claim 6, wherein the thicker portion of the support element has a thickness between 40 μm and 50 μm, and the thinner portion of the support element has a thickness between 20 μm and 30 μm.

9. A head gimbal assembly (HGA), comprising:
a slider to lift a magnetic head from a surface of a rotating disk through a lifting force of a pressure differential generated thereby;
a flexure flexibly coupled to the slider to form a bonding region, the flexure being biased in a direction to oppose the lifting force; and
a support element disposed in the bonding region to decrease flexibility of the flexure therein, the support element applying a force supplemental to the bias on the flexure such that the lifting force lifts the slider and the support element a predetermined distance from the rotating disk,
wherein the support element has a predetermined cross-sectional profile of at least two distinct thicknesses.

10. The HGA of claim 9, wherein the support element spans electrical bonds between pads on the slider and traces on the flexure in the bonding region.

11. The HGA of claim 9, wherein a thinner portion of the support element is between 20 μm and 30 μm thick.

12. The HGA of claim 9, wherein a thicker portion of the support element is between 40 μm and 50 μm thick.

13. The HGA of claim 9, wherein the support element is thicker on outer edges thereof than it is between the outer edges thereof.

14. The HGA of claim 9, wherein the support element is affixed to the slider.

15. The HGA of claim 9, wherein the support element is affixed, to the flexure.

16. The HGA of claim 9, wherein the flexure has disposed thereon a dielectric film, the support element being affixed to the dielectric film.

17. The HGA of claim 16, wherein the support element is affixed to the slider.

18. The HGA of claim 9, wherein the flexure has formed therein a slot, the support element spanning at least a portion of the slot.

19. A hard disk drive (HDD), comprising:
a disk to rotate and generate thereby a pressure differential at the surface thereof;
a head gimbal assembly (HGA), comprising:
a slider to lift a magnetic head from a surface of the rotating disk through a lifting force of the pressure differential generated thereby;
a flexure flexibly coupled to the slider to form a bonding region, the flexure being biased in a direction to oppose the lifting force; and
a support element disposed in the bonding region to decrease flexibility of the flexure therein, the support element applying a force supplemental to the bias on the flexure such that the lifting force lifts the slider and the support element a predetermined distance from the rotating disk; and
an actuator to position the HGA over the rotating disk,
wherein the support element has a predetermined cross-sectional profile of at least two distinct thicknesses.

20. The HDD of claim 19 further comprising:
a parking ramp; and
a parking tab extending from an outer periphery of the flexure and biased against the parking ramp when the HGA is in a parked position,
wherein the actuator positions the HGA on the parking ramp when the HGA is to be in the parked position.

21. The HDD of claim 20, wherein the flexure is free of non-elastic deformation at the support element after a shock of predetermined magnitude and time duration has been applied to the HDD with the HGA in the parked position.

22. The HGA of claim 19, wherein the support element spans electrical bonds between pads on the slider and traces on the flexure in the bonding region.

23. The HDD of claim 22, wherein the electrical bonds in the bonding region are free of cracks after a shock of predetermined magnitude and time duration has been applied to the HDD.

24. The HDD of claim 19, wherein a thinner portion of the support element is between 20 μm and 30 μm thick.

25. The HDD of claim 19, wherein a thicker portion of the support element is between 40 μm and 50 μm thick.

* * * * *